(12) United States Patent
Maglione et al.

(10) Patent No.: US 11,754,422 B2
(45) Date of Patent: Sep. 12, 2023

(54) POSITION SENSOR FOR A MECHANICAL DEVICE AND OPERATING METHOD FOR OPERATING SAID POSITION SENSOR

(71) Applicants: Giuliani S.R.L, Suzzara (IT); OPTOELETTRONICA ITALIA S.R.L., Trento (IT)

(72) Inventors: Alfredo Maglione, Trento (IT); Nicola Battisti, Malosco (IT)

(73) Assignees: GIULIANI S.R.L, Suzzara (IT); OPTOELETTRONICA ITALIA S.R.L., Trento (IT)

( * ) Notice: Subject to any disclaimer, the term of this patent is extended or adjusted under 35 U.S.C. 154(b) by 0 days.

(21) Appl. No.: 17/703,014

(22) Filed: Mar. 24, 2022

(65) Prior Publication Data

US 2022/0307870 A1 Sep. 29, 2022

(30) Foreign Application Priority Data

Mar. 25, 2021 (IT) .................. 102021000007298

(51) Int. Cl.
*G01D 5/347* (2006.01)
*G01D 3/08* (2006.01)

(52) U.S. Cl.
CPC ......... *G01D 5/34746* (2013.01); *G01D 5/347* (2013.01); *G01D 3/08* (2013.01)

(58) Field of Classification Search
CPC ...... G01D 5/34746; G01D 5/347; G01D 3/08; G01D 5/262; G01D 5/48; G01D 5/12; G01D 5/30; G01D 18/006; G01D 18/008; G01D 5/145; G01D 5/268; G01D 13/26; G01D 18/00; G01D 21/00; G01D 2204/22; G01D 4/008; G01D 5/2451; G01D 5/246; G01D 5/26; G01D 5/266; G01D 5/34;

(Continued)

(56) References Cited

U.S. PATENT DOCUMENTS

2016/0177981 A1* 6/2016 Maglione ............ F15B 15/2876
 92/5 R
2017/0363512 A1* 12/2017 Ognibene ............. G01M 15/06
2018/0266853 A1* 9/2018 Battisti .............. G01D 5/34746

FOREIGN PATENT DOCUMENTS

DE 102018130332 A1 6/2020
EP 2647967 A2 10/2013
(Continued)

*Primary Examiner* — Jennifer D Bennett
*Assistant Examiner* — Erin R Garber
(74) *Attorney, Agent, or Firm* — Mark M. Friedman

(57) ABSTRACT

Position sensor for a mechanical device, including: an optical emitter arranged for projecting an incident radiation on a positioning track of the mechanical device provided with multiple optical sections; an optical detector arranged for detecting a reflected radiation coming from the positioning track and for generating a corresponding measurement signal; an electronic processing unit arranged for calculating, on the basis of such measurement signal, a reflectance value indicative of the reflectivity of the zone of the positioning track hit by the incident ray so as to distinguish the different optical sections of the positioning track. The position sensor also comprises a signaling module arranged for sending a warning signal as a function of the reflectance value, in order to provide to the user indications relative to the level of deterioration of the optical sections of the positioning track.

13 Claims, 6 Drawing Sheets

(58) Field of Classification Search
CPC ................ G01D 5/34792; G01D 5/485; F15B 15/2846; G01B 11/00
See application file for complete search history.

(56) References Cited

FOREIGN PATENT DOCUMENTS

| | | |
|---|---|---|
| EP | 3030794 A1 | 2/2015 |
| EP | 3260707 A1 | 12/2017 |
| EP | 3379207 A1 | 9/2018 |
| WO | 2014118709 A2 | 8/2014 |

\* cited by examiner

POSITION SENSOR FOR A MECHANICAL DEVICE AND OPERATING METHOD FOR OPERATING SAID POSITION SENSOR

DESCRIPTION

Field of Application

The present invention regards a position sensor for a mechanical device and a method for operating said position sensor.

The present position sensor and method are inserted in the field of production of optical sensors intended to be applied to mechanical devices provided with movable members in order to detect, preferably continuously, the position (in particular absolute position) of such movable members.

Advantageously, the present position sensor is usable in the field of production and use of linear actuators (e.g. hydraulic cylinders or pneumatic cylinders, valves), pumps, joysticks, etc.

In particular, the present position sensor is intended to be applied to a linear actuator in order to measure the position of the movable stem of such actuator. For example, the present position sensor is employable in hydraulic cylinders which are intended to constitute components of various type (such as steering cylinders, suspensions, stabilizers, etc.) of different types of machines or vehicles (such as farm and earth-moving machinery).

State of the Art

Known in the state of the art are position sensors, in particular of optical type, employed in linear actuators, such as a hydraulic cylinder, in order to detect the position of the piston of the hydraulic cylinder with respect to the containment jacket, as described for example in patents EP 3030794, EP 2951537 and EP 3379207.

In particular, the aforesaid patent EP3030794 describes a hydraulic cylinder provided with a positioning track made along the stem of the piston of the hydraulic cylinder, and a position sensor fixed to the jacket of the hydraulic cylinder and adapted to pick up a specific detection window on the positioning track.

More in detail, the optical device is provided with a light source, such as an LED, adapted to emit a light radiation on the positioning track, and an optical detector (such as a phototransistor, a photodarlington, a photodiode, an optical camera, a photo array sensor or an optical scanner) adapted to detect a reflected radiation coming from the positioning track itself.

The positioning track is provided with a succession of sectors, each of which constituted by two sections with different optical contrast placed one after the other.

In particular, each sector is provided with a first section, with low reflection coefficient (e.g. with black color), and with a second section with high reflection coefficient.

More in detail, the stem of the piston is provided with a chrome-plated surface on which, by means of laser ablation for example, marks are obtained which constitute the first sections of the sectors of the positioning track, while the second sections are obtained from the non-processed zones of the chrome-plated surface of the stem.

In particular, the marked surface (processed) which defines the first sections has a very low reflectivity (e.g. 20%) and the chrome-plated surface which defines the second sections has a very high reflectivity (e.g. 100%).

The position sensor is provided with a control processor which detects, as a function of the light radiation emitted by the optical emitter and of the corresponding reflected radiation coming from the positioning track of the stem, a measurement of the reflectivity of the zone of the positioning track hit by the light radiation.

In order to determine if such zone of the positioning track is occupied by a marked surface (first sections) or by a chrome-plated surface (second sections), the position sensor compares the measurement of the reflectivity with a specific threshold value, set at a reflectance value (e.g. 60%) such to ensure a good reliability in the identification of the section. In particular, if the measurement of the reflectivity is lower than the aforesaid threshold value, the position sensor will identify a marked surface (and hence a first section), while if it is great than such threshold value, the position sensor will identify a chrome-plated surface (and thus a second section).

During the life cycle of the hydraulic cylinder, the surface of the stem of the piston, on which the positioning track is made, is subjected to factors that can alter the reflectivity of the marked surface and/or of the chrome-plated surface, for example following wear caused by the scraping of the surface of the piston with the seals of the jacket. In particular, the wear to which the surface of the piston is subjected can increase the reflectivity of the marked zones (since the abrasion of the seals leads to fading the laser processing) and to lowering or increasing the reflectivity of the chrome-plated zones (since the seals could further polish the chrome or render it more opaque, depending on the application conditions).

In order to allow the hydraulic cylinder to continue correctly operating, the processor of the position sensor is provided with an adaptation algorithm arranged for varying the threshold value as a function of the variations of reflectivity of the marked zones and of the chrome-plated zones, in a manner such that the sensor can reliably discriminate the two zone types. For example, if the chrome-plated zones maintain a reflectivity of 100% (as normally happens) and the marked zones sustain an increase of the reflectivity from 20% to 50%, the adaptation algorithm moves the threshold value to a greater reflectance (e.g. 75%), ensuring a reliable discrimination of the different zones (and hence of the corresponding sections of the positioning track).

A drawback of the position sensor of known type described briefly above is due to the fact that the operator is unable to directly detect the level of deterioration of the initial reflectivity of the sections of the positioning track, if not until the moment in which the position sensor fails in reading (giving an error) due to an excessive variation of the reflectivity (which cannot be compensated for by means of the movement of the threshold value). In such condition, nevertheless, the error of the sensor determines a malfunction of a failure of the hydraulic cylinder, with consequent non-operation of the machine on which it is installed and possible safety risks for the operators.

Such drawback is particularly significant in the event in which, due to a damage to the cylinder or of a non-compliant mechanical design of the same, very quick wear phenomena are triggered (caused for example by infiltrations of sand or other material in the seals or by particularly strong transverse thrusts), which cause a damage of the surfaces of the positioning track of the stem. In such conditions, in fact, the operator is unable to detect the cause of the wear by means of the ordinary maintenance checks, but will simply be able to establish the damage when the position sensor will give an error due to the failure of the reading of the sections of the positioning track.

Presentation of the Invention

In this situation, the essential object of the present invention is therefore that of overcoming the drawbacks manifested by the solutions of known type, by providing a position sensor for a mechanical device and a method for operating said position sensor, which allow reliably providing diagnostic information of the mechanical device to the user.

A further object of the present invention is to provide a position sensor for a mechanical device and a method for operating said position sensor, which allow preventing situations that are potentially dangerous for the user.

A further object of the present invention is to provide a position sensor for a mechanical device and a method for operating said position sensor, which allow a simple and intuitive use of the mechanical device.

A further object of the present invention is to provide a position sensor for a mechanical device and a method for operating said position sensor, which allow providing the position measurement of the mechanical device in a precise and reliable manner A further object of the present invention is to provide a position sensor for a mechanical device and a method for operating said position sensor, which allow an extended useful lifetime of the mechanical device.

A further object of the present invention is to provide a position sensor for a mechanical device that is structurally simple and inexpensive to attain.

BRIEF DESCRIPTION OF THE DRAWINGS

The technical characteristics of the invention, according to the aforesaid objects, and the advantages thereof, will be more evident from the following detailed description, made with reference to the enclosed drawings, which represent several merely exemplifying and non-limiting embodiments of the invention, in which.

DETAILED DESCRIPTION OF A PREFERRED EMBODIMENT

Figure 1:
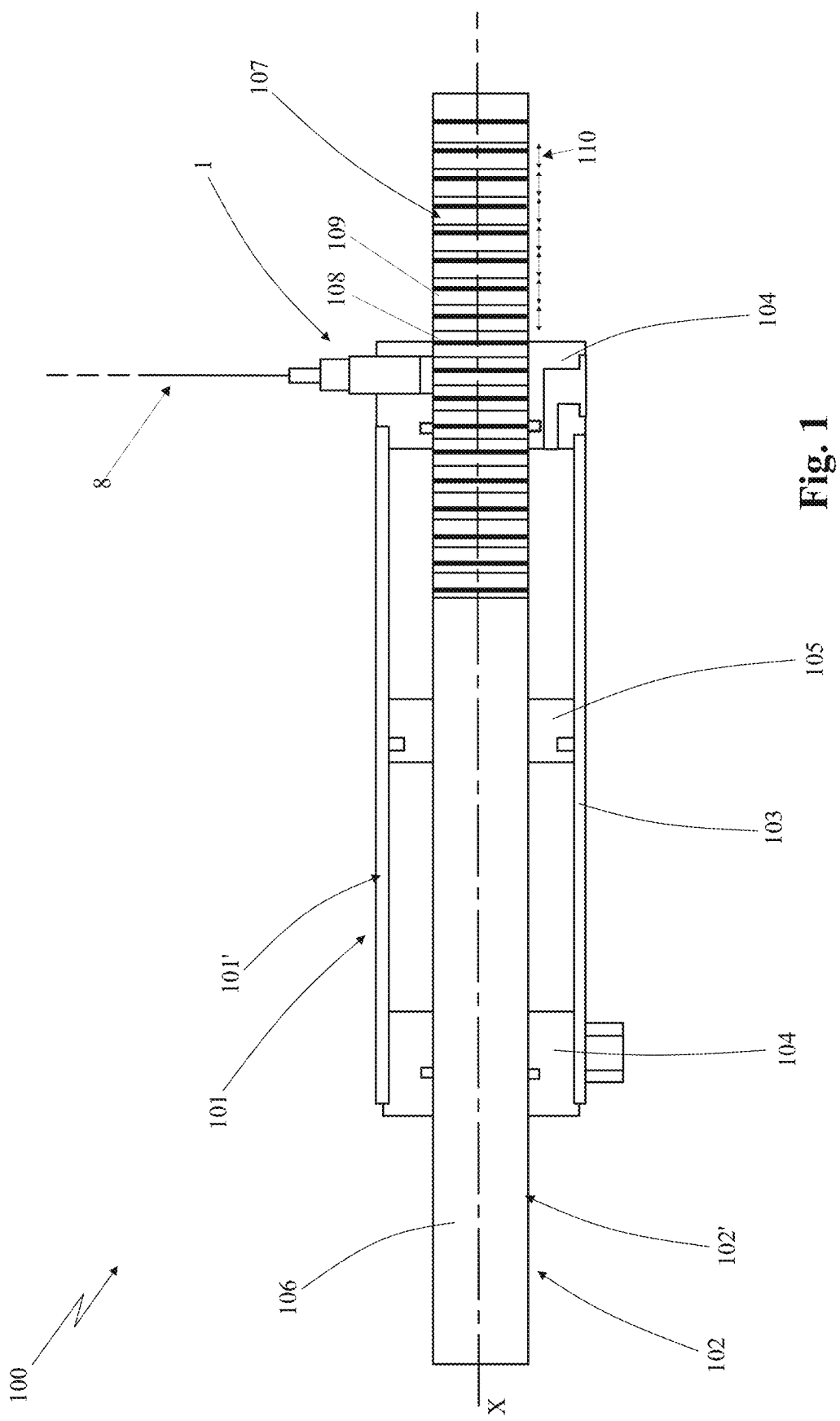
FIG. 1 illustrates a sectional view of an example of a mechanical device to which the present position sensor is applied.

With reference to the enclosed drawings, reference number 1 overall indicates a position sensor for a mechanical device, object of the present invention.

In accordance with the embodiments illustrated in the enclosed figures, the present position sensor 1 is intended to be applied to a mechanical device 100 provided with at least one movable member, so as to detect, preferably in continuously, the absolute position of such movable member.

The aforesaid mechanical device 100 can be applied to any type of machine, for example farm machinery and earth-moving machinery.

In particular, the mechanical device 100 comprises at least one first mechanical member 101 and at least one second mechanical member 102 that are movable with relative motion with respect to each other.

In accordance with the embodiment illustrated in FIG. 1, the present position sensor 1 is applicable to a mechanical device 100 whose mechanical members 101, 102 are movable with linear motion with respect to each other.

In particular, such mechanical device 100 comprises a linear actuator (e.g. a hydraulic cylinder or a pneumatic cylinder, a piston, a brake, a valve), a plunger pump, etc.

With reference to the particular example illustrated in FIG. 1, the mechanical device 100 is a hydraulic cylinder, whose first mechanical member 101 is a jacket 101' extended between two ends according to an axis X, and whose second mechanical member 102 is a piston 102' slidably coupled to the jacket 101' and linearly movable according to the aforesaid axis X. More in detail, the jacket 101' is provided with a tubular body 103 with axis X and closed at the ends by two closure walls 104 provided with corresponding through holes. The piston 102' comprises a plunger 105 inserted in the jacket 101' and a stem 106 fixed to the plunger 105, extended parallel to the axis X and slidably and sealingly inserted (by means of suitable seals) in the through holes of the closure walls 104.

In accordance with a different embodiment (not illustrated in the enclosed figures), the position sensor 1 is applicable to a mechanical device 100 whose mechanical members 101, 102 are movable with rotary motion with respect to each other. In accordance with a further non-illustrated embodiment, the present position sensor 1 is applicable to a mechanical device 100 whose mechanical members 101, 102 are movable with rotational-translational motion with respect to each other.

Advantageously, the position sensor 1 is intended to be mounted on the first mechanical member 101 of the mechanical device 100, in particular in fixed position, it being intended that the position sensor 1 can be mounted on any component in fixed position with respect to the first mechanical member 101, which allows the position sensor 1 to frame at least part of the second mechanical member 102. On the latter, a positioning track 107 is arranged that is provided with multiple optical sections 108, 109 having different optical contrast and adapted to identify a corresponding point of the second mechanical member 102, as described in detail hereinbelow.

In accordance with the embodiment illustrated in FIG. 1, the first mechanical member 101 is the fixed member of the mechanical device 100 and the second mechanical member 102 is the movable member, in a manner such that the position sensor 1 is placed on the fixed member, while, suitably, the positioning track is placed on the movable member.

In particular, with reference to the example illustrated in FIG. 1, the position sensor 1 is fixed on the jacket 101' of the hydraulic cylinder, in particular at one of the closure walls 104 of the jacket 101' itself, and the positioning track 107 is made on the stem 106 of the piston 102' of the hydraulic cylinder.

Of course, without departing from the present invention, the position sensor 1 can be placed on the movable member while the positioning track 107 can be placed on the fixed member.

Figure 2:
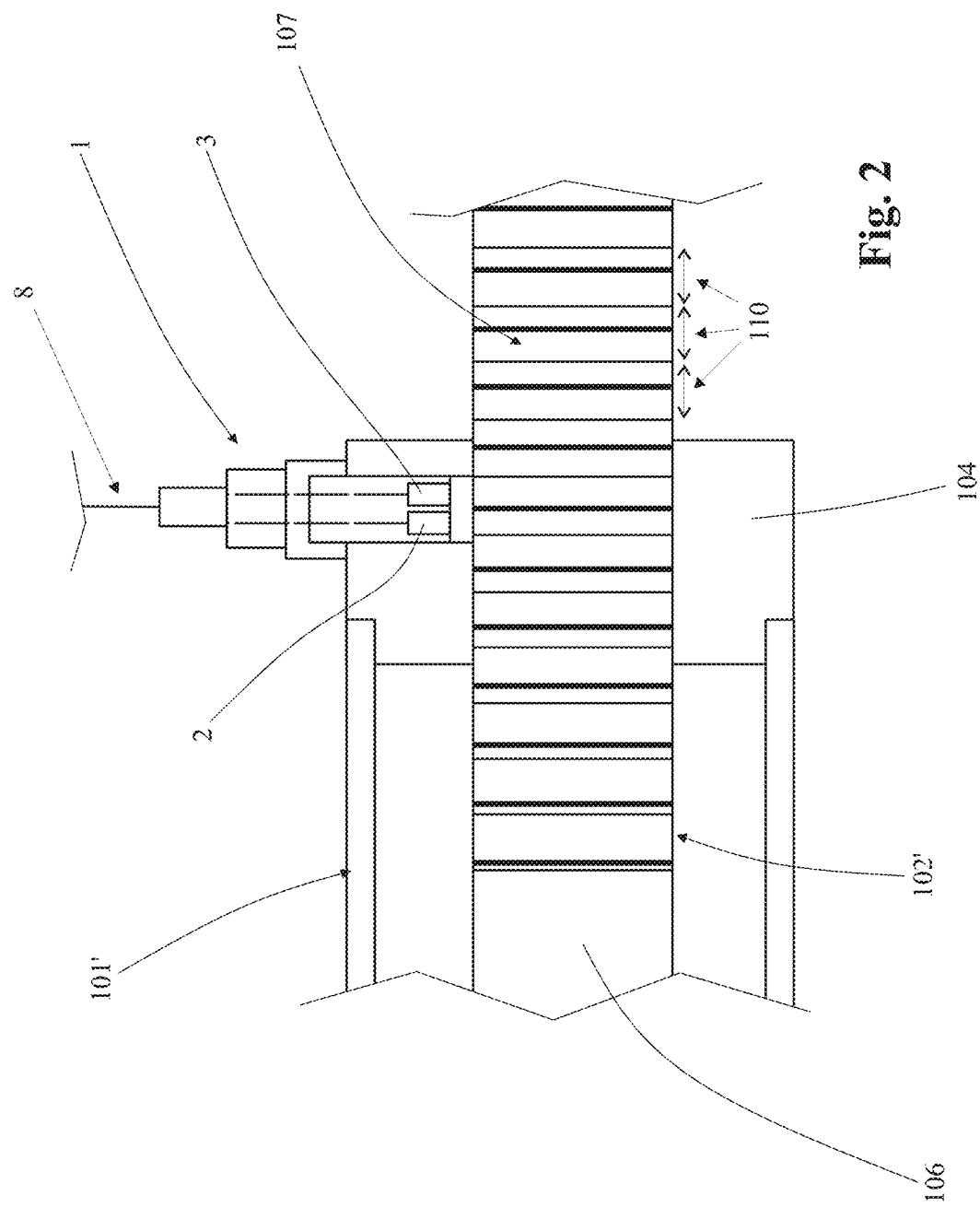
FIG. 2 illustrates a particular of the mechanical device illustrated in FIG. 1, relative to the present position sensor.
Figure 3:
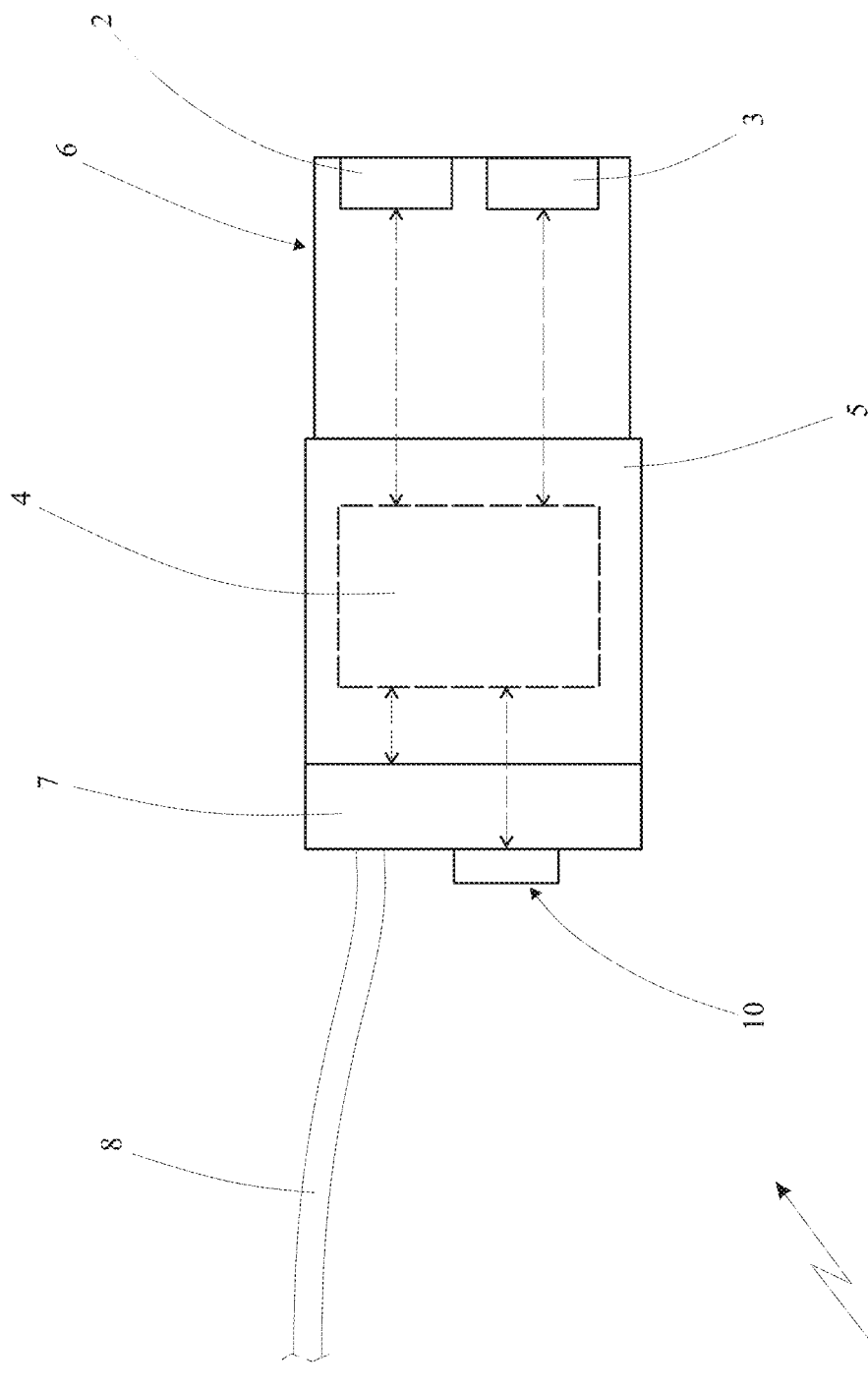
FIG. 3 shows a schematized representation of the present position sensor.
Figure 4:
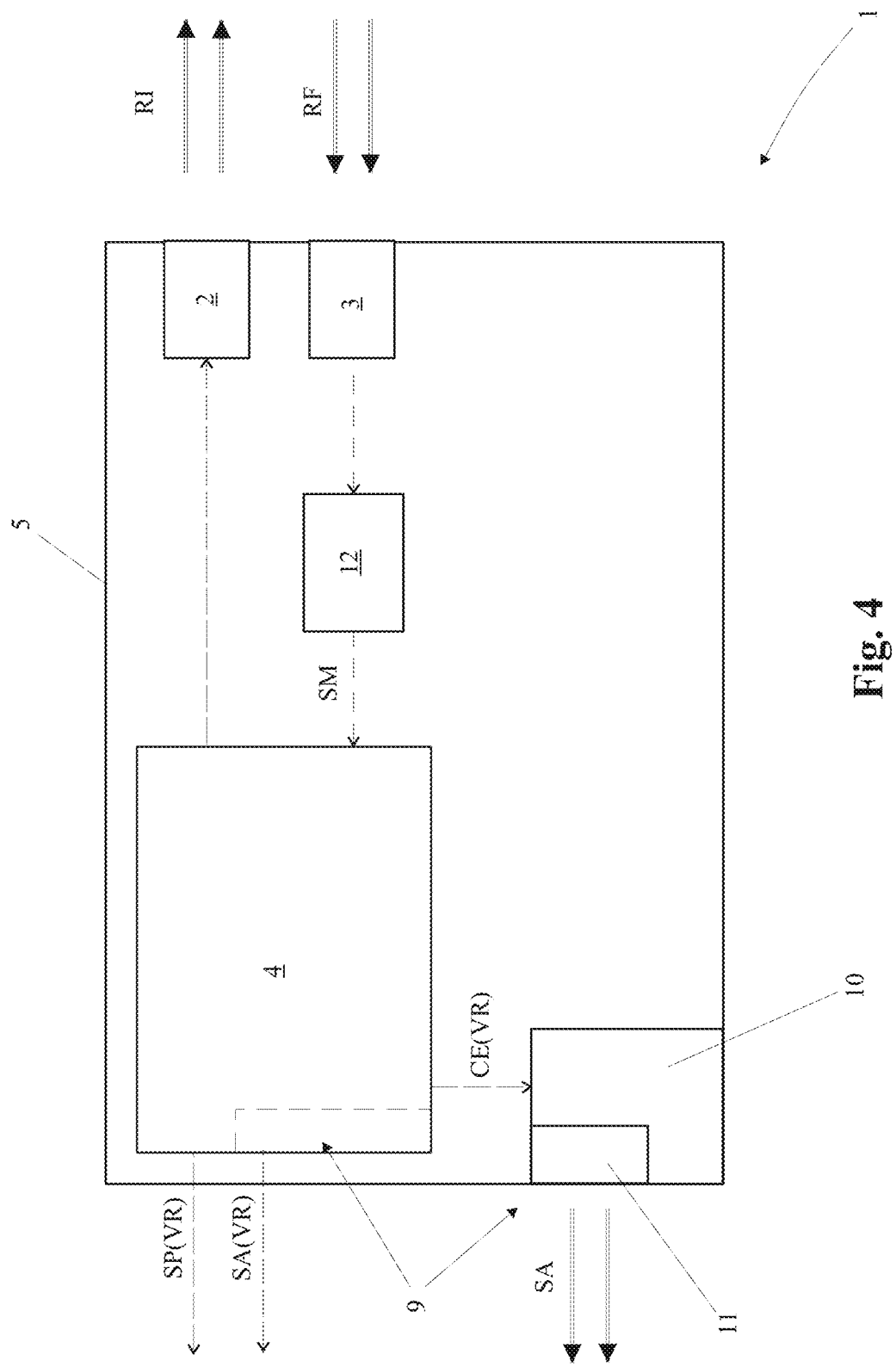
FIG. 4 illustrates a simplified block diagram of the main components of the present position sensor.

According to the present invention, with reference to FIGS. 2-4, the position sensor 1 comprises at least one optical emitter 2, which is arranged for projecting, on the second mechanical member 102, an incident radiation RI adapted to be projected onto the positioning track 107 placed on such second mechanical member 102.

In particular, the incident radiation RI is projected on the positioning track 107 at a projection zone (e.g. with several millimeters width) and is reflected by such projection zone, from which therefore a reflected radiation RF is propagated (preferably in a diffused manner).

In addition, the position sensor 1 comprises at least one optical detector 3, which is arranged for detecting the reflected radiation RF coming from the projection zone on the positioning track 107 hit by the aforesaid incident radiation RI. Following the reception of the reflected radiation RF, the optical detector 3 is arranged for generating a corresponding measurement signal SM, preferably of electrical type.

The position sensor 1 also comprises an electronic processing unit 4 arranged in order to receive the measurement signals SM from the optical detector 3 and for generating, on the basis of such measurement signals, reflectance values VR indicative of the reflectivity of the optical sections 108, 109 of the positioning track 107.

Advantageously, the position sensor 1 comprises, in a per se conventional manner, a containment body 5 in which the electronic processing unit 4, the optical emitter 2 and the optical detector 3 are housed. Preferably, the containment body 5 is provided with a measurement head 6 provided with a window (possibly closed by a transparent screen) at which the optical emitter 2 and the optical receiver 3 are placed for, respectively, emitting the incident radiation RI and detecting the reflected radiation RF.

Suitably, the position sensor 1 is provided with an electrical connector 7, fixed to the containment body 5, for example on the opposite side of the measurement head 6, and arranged for electrically connecting the electronic processing unit 4 to a communication line 8 (wired or wireless) in particular provided with a power supply line and/or with a data transmission line for allowing the electronic processing unit 4 to communicate with an electronic control unit of the mechanical device 100 or of the machine including such mechanical device 100.

Advantageously, the electronic processing unit 4 comprises at least one electronic processor (in particular a microprocessor) in particular provided with suitable input and output ports for the communication with the other components of the position sensor 1.

With reference to the example of FIGS. 1 and 2, the positioning track 107 made on the surface of the second mechanical member 102 is provided with first optical sections 108 and with second optical sections 109 having different optical contrast, placed in alternate succession with respect to each other. In particular, the second optical sections 109 have a different reflectivity with respect to the first optical sections 108.

Preferably, the first optical sections 108 have a low reflectivity (e.g. with a nominal reflectance value of about 20%), and the second optical sections 109 have a high reflectivity (e.g. with a nominal reflectance value of about 100%).

According to a possible embodiment implementation, the second mechanical member 102 is provided with a chrome-plated surface on which, by means of for example laser ablation, the first optical sections 108 (e.g. with black color) of the positioning track 107 are obtained, while the second optical sections 109 are obtained from the non-processed zones of the aforesaid chrome-plated surface.

With reference to the example of FIG. 1, the positioning track 107 is provided with a succession of sectors 110, each of which comprises at least one first and a second optical section 108, 109 placed one after the other, for example two or four of such optical sections 108, 109.

In particular, at least some of the optical sections 108, 109 of each sector 110 have thickness greater than the optical sections 108, 109 of the preceding sector 110 by a specific increase pitch, in a manner such that each sector 110 represents an optical code different from that of each other sector 110. In this manner, when each sector 110 of the positioning track 107 passes at the position sensor 1, the latter detects the optical characteristics of such sectors 110 which allows identifying the position of the sector along the positioning track 107 and therefore the position of the first mechanical member 101 with respect to the second mechanical member 102. Several examples of codes for identifying the sectors 110 (and hence the position of the mechanical device 100) are described in the patents EP 2951537, EP 3030794 and EP 3379207.

Of course, the positioning track 107 can also comprise more than two types of optical sections with different optical contrast (e.g. three), as a function of the specific code that the positioning track 107 implements.

Preferably, the electronic processing unit 4 is operatively connected to the optical emitter 2 in order to drive the latter to emit the incident radiation RI, which hits the positioning track 107 on the aforesaid projection zone. Upon varying the position of the second mechanical member 102, the projection zone hit by the incident radiation RI is extended over different optical sections 108, 109, which, following their different optical contrast, determine different characteristics of the reflected radiation RF.

In addition, the electronic processing unit 4 is operatively connected to the optical detector 3 in order to receive the measurement signal SM generated by the latter following the detection of the reflected radiation RF.

In particular, following the reception of the measurement signal SM, the electronic processing unit 4 is arranged for calculating, on the basis of such measurement signal SM, a reflectance value VR indicative of the reflectivity of the projection zone on the positioning track 107, from which corresponding reflected radiation RF arrives.

In particular, the reflectance value VR can correspond to the reflectance of such projection zone of the positioning track 107 affected by the incident radiation RI, or be any one parameter associated with the reflectance, in particular made by the latter.

In a per se conventional manner, the reflectance values VR calculated by the electronic processing unit 4 starting from said measurement signal SM generated by said optical detector 3 are preferably comprised within a sensitivity field extended between a maximum value Vmax, which in particular corresponds to the reflectance value VR indicative of the maximum reflectivity of the optical sections 108, 109 perceptible by the optical detector 3, and a minimum value Vmin, which in particular corresponds to the reflectance value VR indicative of the minimum reflectivity of the optical sections 108, 109 perceptible by the optical detector 3 and with which, for example, a percentage equal to 0% of the maximum value Vmax is associated.

The electronic processing unit 4 is also arranged for comparing the reflectance value VR with a discrimination value VD, in order to identify if the projection zone of the positioning track 107 associated with such reflectance value VR belongs to one of the first optical sections 108 or to one of the second optical sections 109.

More in detail, such discrimination value VD identifies a first reflectance interval IR1 adapted to be associated with the first optical sections 108 and a second reflectance interval IR2 adapted to be associated with the second optical sections 109.

If the reflectance value VR is within the first reflectance interval IR1, the electronic processing unit 4 is arranged for generating a first identification parameter ID1 associated with the first optical sections 108; if the reflectance value VR is in the second reflectance interval IR2, the electronic processing unit 4 is arranged for generating a second identification parameter ID2 associated with the second optical sections 109.

In this manner, if the reflectance value VR belongs to the first reflectance interval IR1, the corresponding projection zone of the positioning track 107 will be associated with a first optical section 108; if, on the other hand, the reflectance value VR belongs to the second reflectance interval IR2, the corresponding projection zone of the positioning track 107 will be associated with a second optical section 109.

The electronic processing unit 4 is arranged for generating, as a function of the aforesaid identification parameters ID1, ID2, a position signal SP containing information that regards the position of the second mechanical member 102.

More in detail, the electronic processing unit 4 is arranged for processing the identification parameters ID1, ID2 so as to calculate a position parameter indicative of the sector 110 of the positioning track 107 framed by the position sensor 1 and, thus, the position of the second mechanical member 102. Such position parameter will be contained in the aforesaid position signal SP.

Advantageously, such position signal SP is intended to be sent, by means of the communication line 8, to the control unit of the machine in order to provide the correct instructions to the control unit itself and the information to the user regarding the position of the mechanical device 100.

As discussed in the description of the state of the prior art, during the life cycle of the mechanical device 100, the positioning track 107 is subjected to deterioration factors (e.g. via wear) which can considerably modify the nominal reflectance values of its optical sections 108, 109. For example, the first optical sections 108 (dark) can be faded or scratched (for example by the abrasion action of the seals of the jacket 101' of the cylinder or by other environmental agents), increasing their reflectivity, and/or the second optical sections 109 (chrome-plated) can be made opaque (for example from the action of the seals) or scratched/dirtied by other factors, increasing or decreasing their reflectivity.

If the reflectivity of one or more of the first optical sections 108 exits from the aforesaid first reflectance interval IRI (in particular exceeding the discrimination value VD), and/or the reflectivity of one or more of the second optical sections 109 exits from the aforesaid second reflectance interval IR2 (in particular falling below the discrimination value VD), there is the risk that the electronic processing unit 4 will be unable to correctly classify the projection zone on the positioning track 107, generating reading errors by the position sensor 1.

In order to prevent this drawback, the position sensor 1 comprises a signaling module 9 operatively associated with the electronic processing unit 4, which is arranged for controlling such signaling module 9 to send warning signals SA as a function of the calculated reflectance value VR.

In particular, such warning signals SA are aimed to inform the user of the mechanical device 100 regarding the state of integrity of the optical sections 108, 109 of the positioning track 107, as described in detail hereinbelow.

In this manner, such warning signals SA, which are generated as a function of the current measurements of the reflectance of the optical sections 108, 109 of the positioning track 107, allow verifying if the reflectivity of such optical sections 108, 109 is shifted from their nominal initial value (for example following deterioration of the surface of the second mechanical member 102), therefore allowing the conduction of previous actions (e.g. by means of maintenance operations), before an excessive deterioration of the positioning track 107 causes a reading error by the position sensor 1 and hence a malfunctioning of the mechanical device 100.

Advantageously, in accordance with a particular first embodiment of the invention, the signaling module 9 comprises an electrical transduction device 10 operatively connected to the electronic processing unit 4 and arranged in order to receive an electric command CE from the electronic processing unit 4 and for transducing said electric command CE into a corresponding warning signal SA, for example of visual or acoustic type, in a manner such that it can be perceived by the user.

Preferably, the electrical transduction device 10 comprises at least one light source 11 (e.g. of LED type) arranged for emitting one or more warning signals SA in the form of light signals.

In accordance with a particular first embodiment, the light source 11 can comprise a multicolor LED, which is controlled by the electronic processing unit 4 to emit a light of different color as a function of different states of deterioration of the optical sections 108, 109 of the positioning track 107 detected on the basis of the reflectance values VR (as discussed in detail hereinbelow).

In particular, the aforesaid electrical transduction device 10 is mounted on the containment body 5 of the present position sensor 1. In this manner, for example, an operator that is situated alongside the farm machinery or earth-moving machinery, on which the position sensor 1 itself is preferably installed, can easily see the warning signals SA in the form of light signals emitted by the light source 11 of the electrical transduction device 10 of the signaling module 9 itself.

In accordance with a second embodiment of the invention, the signaling module 9 is arranged for sending the warning signal SA, in the form for example of data signals, to a further electronic device of the mechanical device 100 or of the machine on which the latter is mounted, for example in order to appear as a visual signal on the control panel of the machine. In accordance with such embodiment, the signaling module 9 is integrated (for example at the software) in the electronic processing unit 4 and is adapted to send the warning signal SA by means of an output periphery device of the present position sensor 1 connected to the communication line 8.

For example, in accordance with this second embodiment, the signaling module 9 is arranged for sending the warning signal SA when the reflectance of the optical sections 108, 109 of the positioning track 107 is moved away by a certain safety height from the nominal initial value, even if still allowing the correct operation of the position sensor 1.

In this manner, the warning signal SA, by means of for example the turning on of a warning light on the machine control panel, can previously signal a possible critical condition, allowing the user to intervene before failure or malfunction situations have been reached.

Further, preferably, the data signal that constitutes the warning signal SA contains (in analog or digital format) information of the (or proportional to the) reflectance values VR, which can be displayed on the machine control panel by means of a suitable indicator (for example graduated), which allows the user to detect the state of integrity of the positioning track 107 and hence intervene when it has fallen below a specific level. In such embodiment, the warning signal SA can be obtained for example by means of an analog output of the position sensor 1 (connected to the communication line 8) which varies between two voltage thresholds.

Of course, the position sensor 1 can be provided with only one or both configurations described in the aforesaid first and second embodiments.

According to the idea underlying the present invention, when the electronic processing unit has obtained the reflectance value VR from the measurement signal SM, if the reflectance value VR is within the first reflectance interval IR1 (associated with the first optical sections 108 of the positioning track 107), the electronic processing unit 4 is configured for comparing such reflectance value VR with at least one first deviation value VS1, in order to detect possible deviations of the reflectance value VR from the nominal value of the reflectivity of the first optical sections 108.

The aforesaid first deviation value VS1 identifies at least two first state intervals IS1, each of which associated with a specific state of integrity of the first optical sections 108.

Following the comparison of the reflectance value VR with the first deviation value VS1, the electronic processing unit 4 is configured for controlling the signaling module 9 to emit the corresponding warning signal SA as a function of the position of the reflectance value VR with respect to the first state intervals IS1 (i.e. as a function of which of the first state intervals IS1 is occupied by the reflectance value VR).

In this manner, therefore, the position sensor 1 is capable of providing to the user warning signals SA which are indicative of possible variations of the reflectivity of the first optical sections 108, caused for example by deterioration or wear of the surface of the second mechanical member 102. This allows the user to previously know possible situations that determine variations of the reflectivity of the first optical sections 108 before such variations are so high to cause reading errors of the position sensor 1, thus allowing the intervention on the mechanical device 100 before the onset of malfunctioning situations of the latter.

More in detail, the electronic processing unit 4 is arranged at least for comparing the reflectance values VR that are situated in the first reflectance interval IR1 (associated with the first optical sections 108) with the first deviation value VS1 since, for example, in the embodiment implementation applied to farm or earth-moving machinery and provided with first optical sections 108 attained by means of laser ablation and with second chrome-plated optical sections 109, the first optical sections 108 tend to be worn more quickly with use with respect to the second optical sections 109. Therefore, by means of the comparison with the first deviation value VS1, even only of reflectance values VR contained in the first reflectance interval IR1 that is associated with the first optical sections 108, it is possible to monitor the state of integrity or cleaning of the entire positioning track 107, of course the state of integrity or cleaning of the aforesaid positioning track 107 necessarily being dependent on the state of integrity or cleaning of the first optical sections 108 which, in accordance with the particular above-described implementation, are those which tend to be worn more quickly.

Advantageously, if (from the comparison with the discrimination value VD) the reflectance value VR falls within the aforesaid second reflectance interval IR2 (associated with the second optical sections of the positioning track), the electronic processing unit is configured for comparing such reflectance value VR with at least one second deviation value VS2, in order to detect possible deviations of the reflectance value VR from the nominal reflectance value of the second optical sections 109 (in a manner analogous to that described above for the first optical sections 108).

More in detail, the aforesaid second deviation value VS2 identifies at least two second state intervals IS2, each of which associated with a specific state of integrity of the second optical sections 109.

Following the comparison of the reflectance value VR with the second deviation value VS2, the electronic processing unit 4 is configured for controlling the signaling module 9 to emit the corresponding warning signal SA as a function of the position of the reflectance value VR with respect to the second state intervals IS2.

In this manner, the position sensor 1 is capable of providing the user with the warning signals SA that are also indicative of possible variations of the reflectivity of the second optical sections 109, which could determine malfunctions of the mechanical device 100.

Hence, the position sensor 1 is also capable of informing the user regarding conditions of degradation relative to the second optical sections 109 of the positioning track 107.

In accordance with a particular embodiment, the discrimination value VD is fixed. In this manner, the electronic processing unit 4 is only configured for executing the comparison of the calculated reflectance values VR with the same discrimination value VD, so as to establish if they are situated in the first reflectance interval IR1 or in the second reflectance interval IR2, and for—once it has been established that the reflectance values VR are in the first reflectance interval IR1—executing the comparison of these with the first deviation value VS1, so as to monitor the state of integrity, wear or cleaning at least of the first optical sections 108. This allows the use of an electronic processing unit 4 that is simple and quick in operation, which does not require therefore a high calculation power.

In accordance with a further embodiment, the electronic processing unit 4 is arranged for comparing the reflectance values VR with two different fixed discrimination values VD, one of which delimiting the first reflectance interval IR1 and the other delimiting the second reflectance interval IR2 separated from the first reflectance interval IR1. In this manner, it is possible to establish the position signals SP generated by the electronic processing unit 4 as a function of the identification parameters ID1, ID2, which are in turn generated by the same electronic processing unit 4 as a function of the position of the reflectance values VR with respect to the first reflectance interval IR1 or to the second reflectance interval IR2. Indeed, in particular, the two separate discrimination values VD prevent a set of reflectance values VR particularly close to one of the two discrimination values VD or oscillating around one of the two discrimination values VD from leading to the generation, by the electronic processing unit 4, of an incorrect sequence of identification parameters ID1, ID2, alternated with each other.

Otherwise, in accordance with another embodiment, the electronic processing unit 4 is arranged for modifying the discrimination value VD as a function of the calculated reflectance values VR (i.e. in particular calculated by the electronic processing unit 4 starting from the measurement signals SM generated by the optical detector 3). This in particular allows increasing the operating lifetime of the position sensor 1, allowing the latter to operate correctly even in the presence of variations (within a certain limit) of the reflectance of the optical sections 108, 109 of the positioning track 107.

Advantageously, the discrimination value VD is variable between an upper threshold SU (e.g. 80%) and a lower threshold SI (e.g. 40%), and such upper threshold SU and lower threshold SI are in particular fixed.

More in detail, within the aforesaid upper threshold SU and the aforesaid lower threshold SI, the correct recognition of the optical sections 108, 109 of the positioning track 107 is ensured, with a suitable reliability.

Therefore, such fixed upper threshold SU and fixed lower threshold SI preferably have safety threshold function.

In particular, the discrimination value VD is increased in the case of increase of the reflectance value of the first optical sections 108, or it is decreased in the case of reduction of the reflectance value of the second optical sections 109.

In addition, more in detail, the arrangement of an electronic processing unit 4 capable both of varying the discrimination value VD within the upper threshold SU and the lower threshold SI, which are fixed, and of comparing at least the reflectance values VR in the first reflectance interval IR1 with respect to the first deviation value VS1, considerably increases the precision and the safety of the present position sensor 1.

Indeed, being able to update the discrimination value VD allows increasing the operating lifetime of the present position sensor 1, when, at the same time, the arrangement of the upper threshold SU (fixed) and of the lower threshold SI (fixed) allows maintaining the same discrimination value VD within a range in which the reading of the positioning track 107 is reliable and, in addition, the comparison of the reflectance values VR with the at least one first deviation value VS1, with consequent emission of the warning signal SA, allows the operator to know the state of wear or dirtiness at least of the first optical sections 108 and hence execute maintenance operations before the first and second optical sections 108, 109 are indistinguishable from each other.

By way of example, the discrimination value VD can be initially set in the electronic control unit at about an intermediate value between the nominal (initial) values of reflectance of the first and second optical sections 108, 109, for example at about 50% or 60%.

In addition, the upper threshold SU is advantageously greater than 50% of the maximum value Vmax, for example equal to 80%, and the lower threshold SI is advantageously lower than 50% of the maximum value Vmax, for example equal to 20%.

In case of increase of the reflectance of the first optical sections 108, the discrimination value VD can thus be increased up to for example 80%, ensuring the operation of the position sensor 1 with a suitable level of reliability. Analogously, in the case of reduction of the reflectance of the second optical sections 109, such discrimination value VD can be decreased, for example to 40%.

Advantageously, the discrimination value VD can be varied on the basis of statistical functions applied to multiple time acquisitions of the measurement signals SM and, hence, of the reflectance values VR.

For example, the electronic processing unit 4 is configured for executing, at pre-established time intervals, a mean of a set of reflectance values VR that are situated below a first reference threshold, which is set by the producer of the present optical sensor 1 and is indicative of the reflectivity of the first optical sections 108, in order to execute a mean of reflectance values VR that are situated above a second reference threshold, which is set by the producer of the optical sensor 1 and is indicative of the reflectivity of the second optical sections 109, and, in addition, in order to identify an intermediate value between the two aforesaid means and set this as a discrimination value VD that can vary at each pre-established time interval.

Figure 6:
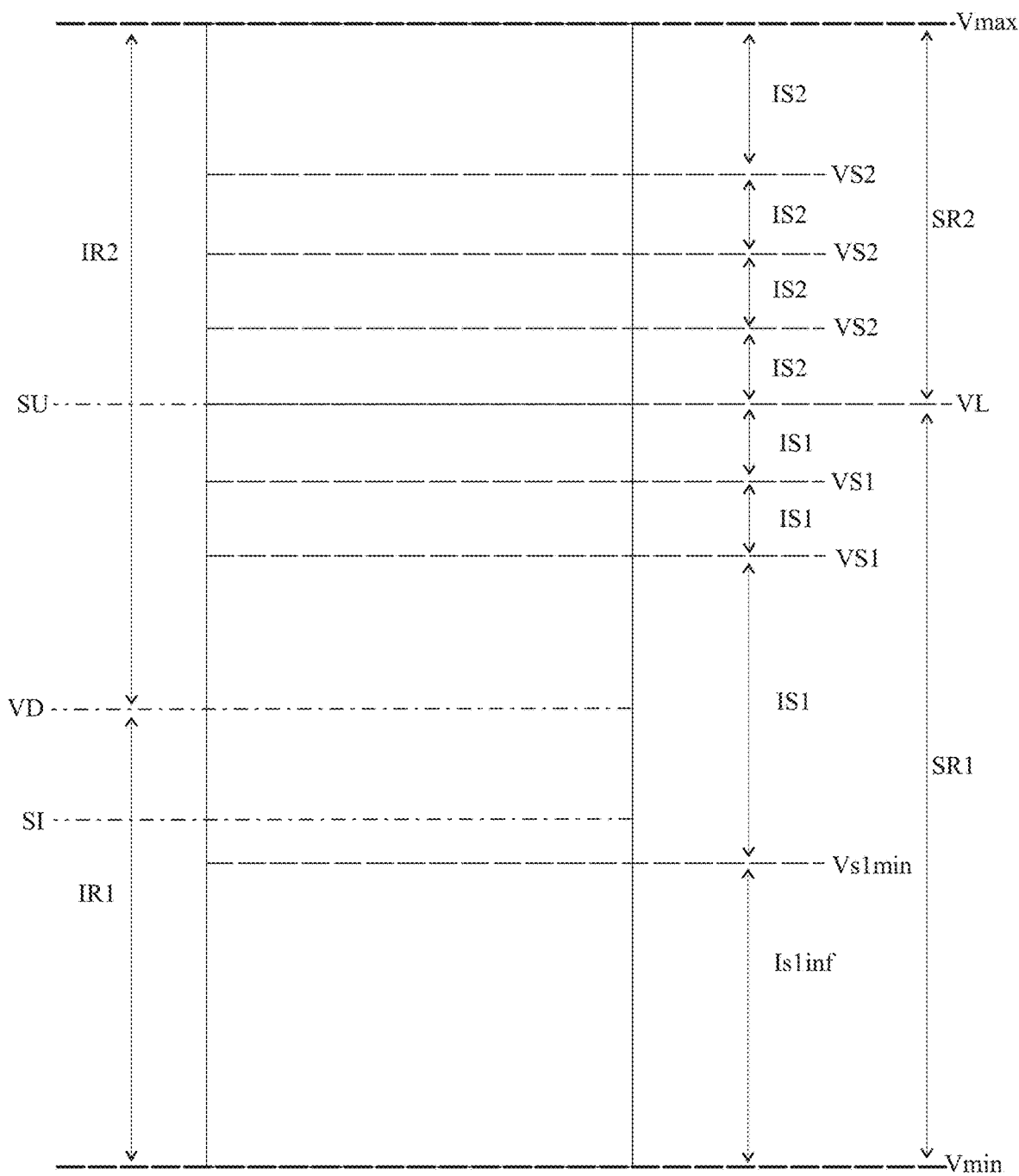
FIG. 6 shows an example of a code of state intervals on the basis of which the position sensor sends specific warning signals.

Advantageously, with reference to FIG. 6, the at least one first deviation value VS1 and the first state intervals IS1 are contained within a first reflectance section SR1 which is associated with the reflectance of the first optical sections 108 and which is extended between the minimum value Vmin (e.g. 0%) and a limit value VL (e.g. 80%).

More in detail, the limit value VL is of course greater than the minimum value Vmin and, in addition, smaller than the maximum value Vmax.

In addition, more in detail, the limit value VL coincides with the upper threshold SU, i.e. in particular with the highest value that the variable discrimination value VD can take on.

In addition, the first deviation value VS1 advantageously comprises a first minimum deviation value VS1*min*, which delimits with the minimum value Vmin a first lower state interval IS1*inf*. In addition, the lower threshold SI is, in particular, greater than or equal to the first minimum deviation value VS1*min*.

In particular, in accordance with that illustrated in FIG. 6, the lower threshold SI is contained within the first reflectance section SR1 More in detail, therefore, the discrimination value VD is variable within a range delimited between the upper threshold SU and the lower threshold SI and contained in the first reflectance section SR1. Or rather, more in detail, the discrimination value VD is variable in the first reflectance section SR1 associated with the reflectance of the first optical sections 108, which—in accordance for example with the embodiment implementation applied to farm and earth-moving machinery and provided with first optical sections 108 attained by means of laser ablation and with second chrome-plated optical sections 109—are the optical sections that tend to be worn more quickly with use.

Analogously, the at least one second deviation value VS2 and the second state intervals IS2 are contained within a second reflectance section SR2 which is associated with the reflectance of the second optical sections 109 and which is extended between a maximum value Vmax (e.g. 100%) and the aforesaid limit value VL which separates it from the first reflectance section SR1.

With reference to the example of FIG. 6, multiple (e.g. three) first deviation values VS1 are provided which identify within the first reflectance section SR1 multiple (e.g. four) first state intervals IS1, and multiple (e.g. three) second deviation values VS2 which identify within the second reflectance section SR2 multiple (e.g. four) second state intervals IS2.

Each first and second state interval IS1, IS2 is associated with a corresponding level of integrity respectively of the first and second optical sections 108, 109.

As a function of the state interval IS1, IS2 in which the reflectance value VR is situated, the signaling module 9 is enabled by the electronic processing unit 4 to emit a corresponding warning signal SA.

For example, the signaling module 9 can control the light source 11 of the electrical transduction device 10 to emit a light signal of different color for each state interval IS1, IS2 (e.g. green for the interval that contains the nominal initial value of reflectance of the optical sector, and red for the state interval IS1, IS2 adjacent to the limit value VL).

Suitably, the signaling module 9 can send analogous instructions to a warning light of the machine control panel on which the mechanical device 100 is installed.

In operation, as the reflectivity of the aforesaid first optical sections 108 increases, due to the wear of the first optical sections 108, also the discrimination value VD is updated by the electronic processing unit 4, bringing to towards the limit value VL coinciding with the upper threshold SU. In particular, as the discrimination value VD is increased by the electronic processing unit 4 on the basis of the calculated reflectance values VR, the first reflectance interval IR1 increases up to mating at most with the first reflectance section SR1, i.e. when the variable discrimination value VD is brought to coincide with the limit value VL.

In this manner, in the event in which multiple first deviation values VS1 are set that are indicative of multiple levels of integrity of the first optical sections 108, the variable discrimination value VD increases, being moved away from the first minimum deviation value VS1$min$ and progressively exceeding the first deviation values VS1 and, thus, with the increase of wear, the reflectance values VR calculated by the electronic processing unit 4 exceed the first minimum deviation value VS1$min$, activating the emission of a warning signal SA as a function of the comparison with such first minimum deviation value VS1$min$, and subsequently exceeding the other first deviation values VS1, with consequent activation of further warning signals SA.

Of course, in accordance with a particular implementation, only one (first and second) deviation value VS1, VS2 is provided for each (first and second) reflectance section SRL SR2, in a manner such that the signaling module 9 is enabled to send the warning signal SA only when the reflectance value VR exceeds the deviation value VS, VS2, passing into the interval IS1, IS2 adjacent to the limit value VL.

In this case, therefore, only the first deviation value VS1 is the same first minimum deviation value VS1$min$.

Advantageously, the electronic processing unit 4 is arranged for controlling the signaling module 9 to send the warning signal SA as a function of multiple reflectance values VR sequentially detected by the optical detector 3, in particular by means of one or more statistical functions (e.g. a mean value).

Preferably, the optical emitter 2 of the position sensor 1 comprises a light source, for example of LED type, adapted to emit the incident radiation RI.

Suitably, the optical emitter 2 is arranged for emitting the incident radiation RI in beam form, with opening such to irradiate the positioning track 107 in the irradiation zone with specific shapes and sizes (e.g. a circle with diameter of several millimeters).

Advantageously, the optical emitter 2 is arranged for emitting the incident radiation with wavelengths within the visible spectrum, or (in addition or alternatively) with wavelength outside the visible spectrum (e.g. in infrared or ultraviolet). The selection of the specific wavelengths is caused by the specific information that can be obtained from the corresponding radiations.

Preferably, the optical detector 3 comprises a photoelectric transducer, capable of converting the reflected radiation RF coming from the positioning track 107 into an electrical size (a current or a voltage) that determines the measurement signal SM and advantageously proportional to the intensity of the detected reflected radiation RF.

In particular, the aforesaid photoelectric transducer comprises an electronic device at solid state (such as a phototransistor, a photodarlington, a photodiode, an optical camera, a photo array sensor or an optical scanner) in particular adapted to generate an electric output current proportional to the intensity of the reflected radiation RF that hits the phototransistor itself.

Suitably, the position sensor 1 comprises an electrical conversion device 12 (such as with resistance, an operational trimmer or amplifier) placed to connect between the electronic processing unit 4 and the photoelectric transducer of the optical detector 3, and adapted to convert the output current provided by the the latter into a corresponding measurement voltage signal SM adapted to be acquired by the electronic processing unit 4.

Advantageously, the optical detector 3 comprises multiple photoelectric transducers arranged for detecting the reflected radiation RF coming from corresponding different areas of the projection zone (possibly partially superimposed). This allows rendering the optical detector 3 less sensitive to possible small defects or imperfections (e.g. scratches) present on the optical sections 108, 109, since the parts subjected to such defects, at each detection instant, tend to affect only one or several of the areas detected by the different photoelectric transducers, in a manner such that the reflected radiation RF detected by the other photoelectric transducers is not affected by defects, generating an overall measurement signal SM that is particularly strong.

For example, the photoelectric transducers of the optical detector 3 are electrically connected in parallel, in a manner such that the optical detector 3 generates a current measurement signal given by the sum of the output currents of the single photoelectric transducers, whose electrical intensity, in relation to its absolute value, will be less affected by the single oscillations of one or more of the output currents of the photoelectric transducers generated by the aforesaid local defects.

Advantageously, in order to further improve the precision of calculation of the reflectance value VR, the photoelectric transducers of the optical detector 3 have a current gain that is shifted with respect to each other at most by about ±10%.

Preferably, the photoelectric transducers of the optical detector 3 are attained by means of integrated technology, in particular on a single monolithic support, for example in the form of an array of transducers (such as phototransistors, photodiodes, etc.) cut in a single block. Otherwise, the photoelectric transducers of the optical detector 3 can also be attained by means of discrete components.

Figure 5A:
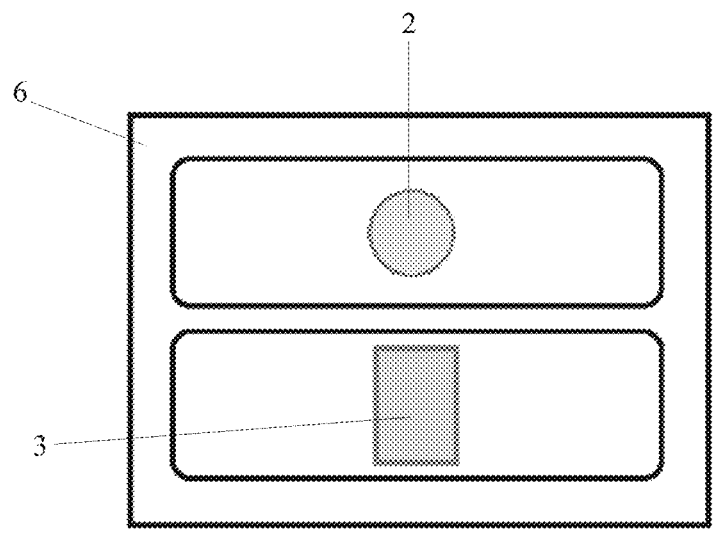
FIGS. 5A, 5B and 5C illustrate, in a schematized manner, corresponding different embodiments relative to the configuration of the optical emitters and of the optical detectors of the position sensor.
Figure 5B:
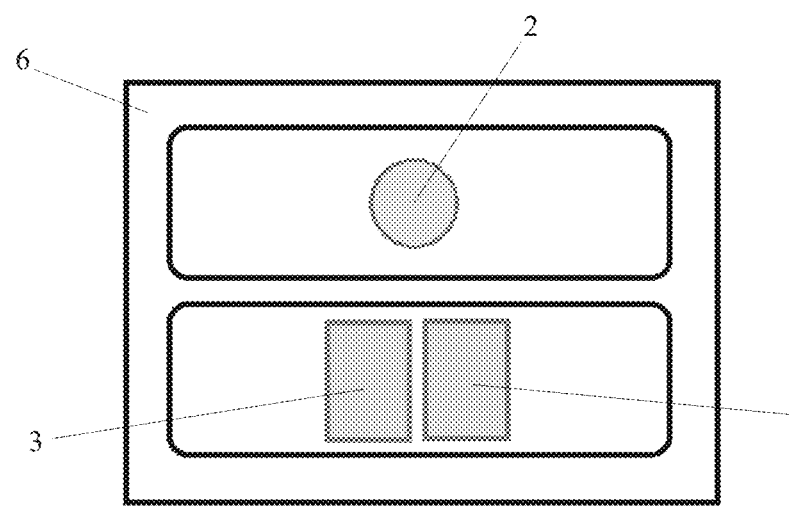
Figure 5C:
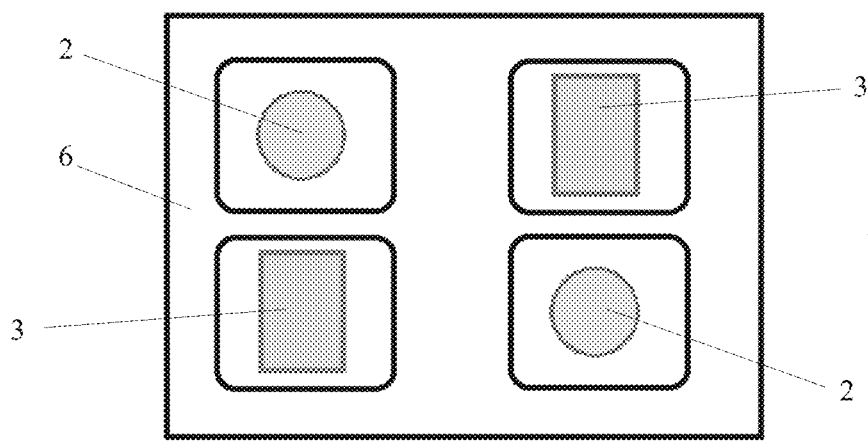

Advantageously, as shown in the examples of FIGS. 5B and 5C, the position sensor 1 comprises multiple optical detectors, which are arranged for generating corresponding measurement signals SM, on the basis of which the electronic processing unit 4 is arranged for calculating the reflectance value VR.

In this manner, the electronic processing unit 4 can use multiple measurement signals SM (provided by multiple different optical detectors 3) for calculating the reflectance value VR, allowing the further compensation for defects present on the optical sections 108, 109 of the positioning track 107 and/or tolerances of the design parameters of the optical detectors 3.

For example, the electronic processing unit 4 can determine the reflectance value VR on the basis of a statistical function of the measurement signals SM of the different optical detectors 3, such as for example a mean or selection function on the basis of most frequent values.

Preferably, each optical detector 3 can comprise an electric transducer, or multiple photoelectric transducers for example in accordance with that discussed above.

Advantageously, the position sensor 1 comprises multiple optical emitters 2, which are arranged for generating multiple corresponding radiations incident on the same area or on different areas of the projection zone (as shown in the example of FIG. 5C).

Suitably, the electronic processing unit 4 is arranged for controlling such optical emitters 2 to be alternately turned on during each detection interval, in a manner such that the optical detector 3 (or the optical detectors 3) separately acquires the reflected radiation RF caused by the incident radiation emitted by each optical emitter 2.

Advantageously, the position sensor comprises multiple optical emitters 2 and multiple optical detectors 3, and the electronic processing unit 4 is arranged for actuating the optical emitters 2 so as to obtain cross-checked measurements obtained by means of different emitter-receiver pairs, for example by actuating first one of the optical emitters 2 in order to acquire the measurement signals SM of each optical detector 3, and then actuating the other of the optical emitters 2 in order to acquire the corresponding measurement signals of each optical detector 3. For example, with reference to the FIG. 4C, for each projection zone to be evaluated, the electronic processing unit 4 can use four measurement signals SM (obtained by means of four different emitter-receiver pairs) in order to calculate the corresponding reflectance value.

Suitably, the electronic processing unit 4 and/or the optical emitters 3 are arranged in a manner such that each optical emitter 2 can generate an incident radiation RI with different characteristics (e.g. intensity or wavelength), in a manner such that the electronic processing unit 4, by means of the optical detectors 3, can acquire measurement signals SM of the same projection zone in different conditions, so as to optimize the reliability of the generated reflectance value VR.

Also forming the object of the present invention is a method for operating the present position sensor 1, regarding which the same nomenclature introduced up to now will be maintained hereinbelow for the sake of description simplicity.

The present method provides that the optical emitter 2 projects, on the second mechanical member 102 of the mechanical device 100, an incident radiation RI that irradiates a projection zone on the positioning track placed on the second mechanical member 102 itself.

The optical detector 3 detects a reflected radiation RF coming from the projection zone of the positioning track 107 hit by the aforesaid incident radiation RI, and generates a corresponding measurement signal SM.

Then, the electronic processing unit 4 calculates, on the basis of such measurement signal SM, a reflectance value VR indicative of the reflectivity of the projection zone of the positioning track 107.

In addition, the electronic unit compares the calculated reflectance value VR with the discrimination value VD, in order to identify in which optical section 108, 109 of the positioning track 107 the projection zone is situated, according to that described above.

More in detail, if the reflectance value VR falls within the first reflectance interval IR1, the electronic processing unit 4 generates a first identification parameter ID1 associated with the first optical sections 108, and, if the reflectance value VR falls within the second reflectance interval IR2, the electronic processing unit 4 generates an identification parameter ID2 associated with the second optical sections 109.

The electronic processing unit 4 generates, as a function of the aforesaid identification parameters ID1, ID2, a position signal SP containing information that regards the position of the second mechanical member 102.

In accordance with the idea underlying the present invention, the electronic processing unit 4 controls the signaling module 9 to send a warning signal SA as a function of the calculated reflectance value VR, so as to provide the user with information regarding the state of integrity of the optical sections 108, 109 of the positioning track 107 before possible malfunctions of the mechanical device 100, in accordance with that described in detail above.

In addition, still in accordance with the idea underlying the present invention, if the reflectance value VR is within the first reflectance interval IR1, the electronic processing unit 4 compares the reflectance value VR with the first deviation values VS and controls the signaling module 9 to emit a corresponding warning signal SA as a function of which of the first state intervals IS1 is occupied by the reflectance value VR, so as to provide an indication on the level of integrity of the first optical sections 108 of the positioning track 107.

Advantageously, if the reflectance value VR is within the second reflectance interval IR2, the electronic processing unit 4 compares the reflectance value VR with the second deviation values VS and consequently controls the signaling module 9 to emit a corresponding warning signal SA as a function of which of the second state intervals IS2 is occupied by the reflectance value VR, so as to provide an indication on the level of integrity of the second optical sections 109 of the positioning track 107.

In addition, the electronic processing unit 4 advantageously modifies the discrimination value VD as a function of the calculated reflectance values VR, and such discrimination value VD is variable between an upper threshold SU and a lower threshold SI.

In this manner, at the same time, the electronic processing unit 4 is capable of increasing the useful lifetime of the present position sensor 1, updating the discrimination value VD within the upper threshold SU and the lower threshold SI which have safety function and, in addition, is capable of communicating with an operator, by means of the emission of the warning signals SA, the state of integrity at least of the first optical sections 108, before the same first optical sections 108 and the second optical sections 109 are indistinguishable from each other. For example, the first optical sections 108 can be those which tend to be worn more quickly and, hence, by warning the operator that their integrity is being damaged, it is possible to warn the operator that the time is approaching for executing a maintenance or cleaning operation over the entire positioning track 107.

In addition, the at least one first deviation value VS1 and the first state intervals IS1 are advantageously contained within a first reflectance section SR1 which is associated with the reflectance of the first optical sections 108 and which is extended between a minimum value Vmin and a limit value VL.

Preferably, the limit value VL coincides with the upper threshold SU.

In addition, the first deviation value VS1 preferably comprises a first minimum deviation value VS1*min*, which delimits, with the minimum value Vmin, a first lower state interval IS1*inf*. More in detail, the lower threshold SI is greater than or equal to the aforesaid minimum deviation value VS1*min*.

In particular, the lower threshold SI is contained in the first reflectance section SR1, in a manner such that the discrimination value VD is variable within a range delimited by the upper threshold SU (coinciding with the limit value VL) and by the lower threshold SI and contained within the first reflectance section SR1.

In this manner, the electronic processing unit 4 varies the aforesaid discrimination value VD within the aforesaid first reflectance section SR1, which is associated with the first optical sections 108, which are for example those which tend to be worn more quickly with use.

The invention thus conceived therefore attains the pre-established objects.

The contents of the Italian patent application number 102021000007298, from which this application claims priority, are incorporated herein by reference.

The invention claimed is:

1. A position sensor for a mechanical device,
    said mechanical device being provided with a first mechanical member and with a second mechanical member, which is susceptible of relative motion with respect to said first mechanical member and is provided with a positioning track provided at least with first optical sections and with second optical sections having different optical contrast with respect to said first optical sections,
    said position sensor comprising:
    an optical emitter, which is arranged for projecting, on the positioning track of said second mechanical member, an incident radiation adapted to irradiate a projection zone on said positioning track;
    an optical detector, which is arranged for detecting a reflected radiation coming from said projection zone hit by said incident radiation, and for generating a corresponding measurement signal;
    an electronic processing unit, which is operatively connected to said optical detector in order to receive said corresponding measurement signal and is arranged for:
        calculating, based on said corresponding measurement signal, a reflectance value indicative of a reflectivity of the projection zone on said positioning track;
        comparing said reflectance value with at least one discrimination value, which identifies at least one first reflectance interval, adapted to be associated with said first optical sections, and a second reflectance interval, adapted to be associated with said second optical sections;
        with said reflectance value (VR) in said at least one first reflectance interval, generating a first identification parameter associated with said first optical sections, and, with said reflectance value in said second reflectance interval, generating a second identification parameter associated with said second optical sections;
        generating, as a function of said first and second identification parameters, a position signal;
    a signaling module operatively associated with said electronic processing unit, which is arranged for controlling said signaling module;
    wherein said electronic processing unit, with said reflectance value within said at least one first reflectance interval, is configured for:
        comparing said reflectance value with at least one first deviation value, which identifies at least two first state intervals, and
        controlling said signaling module to emit a corresponding warning signal as a function of a position of said reflectance value with respect to said at least two first state intervals;
    wherein said electronic processing unit is arranged for modifying said discrimination value as a function of said reflectance values, wherein said discrimination value is variable between an upper threshold and a lower threshold.

2. The position sensor of claim 1, wherein said electronic processing unit, with said reflectance value (VR) within said second reflectance interval, is configured for:
    comparing said reflectance value with at least one second deviation value, which identifies at least two second state intervals, and
    controlling said signaling module to emit said corresponding warning signal as a function of the position of said reflectance value with respect to said at least two second state intervals.

3. The position sensor of claim 1, wherein said signaling module comprises an electrical transduction device operatively connected to said electronic processing unit.

4. The position sensor of claim 3, wherein said electrical transduction device (10) comprises at least one light source (11) arranged for emitting one or more of said corresponding warning signals as light signals.

5. The position sensor of claim 1, further comprising multiple said optical detectors, each of which is arranged for generating a corresponding measurement signal for said reflected radiation; wherein said electronic processing unit is arranged for calculating said reflectance value as base on some or all of said corresponding measurement signals generated by said multiple optical detectors.

6. The position sensor of claim 1, wherein said at least one first deviation value and said at least two first state intervals are contained within a first reflectance section which is associated with a reflectance of said first optical sections and which is extended between a minimum value and a limit value.

7. The position sensor of claim 6, wherein said limit value coincides with said upper threshold.

8. The position sensor of claim 6, wherein said at least one first deviation value comprises a first minimum deviation value, which delimits, with said minimum value, a first lower state interval;
    wherein said lower threshold is greater than or equal to said first minimum deviation value.

9. An operating method for operating the position sensor of claim 1, wherein:
    said optical emitter projects, on said second mechanical member, said incident radiation (RI) which irradiates said projection zone on said positioning track;
    said optical detector detects said reflected radiation coming from the projection zone of said positioning track hit by said incident radiation, and generates said corresponding measurement signal (SM);
    said electronic processing unit (4) calculates, based on said corresponding measurement signal, said reflectance value indicative of the reflectivity of the projection zone on said positioning track;

said electronic processing unit compares said reflectance value with said at least one discrimination value, which identifies said at least one first reflectance interval associated with said first optical sections and said second reflectance interval associated with said second optical sections, if said reflectance value falls within said at least one first reflectance interval, said electronic processing unit generates said first identification parameter associated with said first optical sections, and, if said reflectance value falls within said second reflectance interval, said electronic processing unit generates said second identification parameter associated with said second optical sections;

said electronic processing unit generates, as function of said first and second identification parameters, said position signal;

wherein, if said reflectance value is within said at least one first reflectance interval, said electronic processing unit:

compares said reflectance value with said at least one first deviation value, which identifies said at least two first state intervals, and controls said signaling module to emit said corresponding warning signal as function of which of said at least two first state intervals is occupied by said reflectance value;

wherein said electronic processing unit modifies said at least one discrimination value as function of said reflectance values, wherein said at least one discrimination value is variable between an upper threshold and a lower threshold.

10. The operating method of claim 9, wherein, if said reflectance value is within said second reflectance interval, said electronic processing unit:

compares said reflectance value with said at least one second deviation value, which identifies at least two second state intervals, and controls said signaling module to emit said corresponding warning signal as function of which of said at least two second state intervals is occupied by said reflectance value.

11. The operating method of 10, wherein said at least one first deviation value and said at least two first state intervals are contained within a first reflectance section which is associated with a reflectance of said first optical sections and which is extended between a minimum value and a limit value.

12. The operating method of claim 11, wherein said limit value coincides with said upper threshold.

13. The operating method of claim 11, wherein said at least one first deviation value comprises a first minimum deviation value, which delimits, with said minimum value, a first lower state interval;

wherein said lower threshold is greater than or equal to said first minimum deviation value.

* * * * *